United States Patent [19]

Sand et al.

[11] 4,303,691

[45] Dec. 1, 1981

[54] PROTEINACEOUS FOOD PRODUCT

[75] Inventors: Ralph E. Sand; Richard E. Johnson, both of Plano, Tex.

[73] Assignee: Anderson, Clayton & Co., Houston, Tex.

[21] Appl. No.: 196,010

[22] Filed: Oct. 10, 1980

Related U.S. Application Data

[63] Continuation of Ser. No. 949,928, Oct. 10, 1978, abandoned, which is a continuation-in-part of Ser. No. 916,028, Jun. 15, 1978, abandoned.

[30] Foreign Application Priority Data

Nov. 9, 1977 [GB] United Kingdom ............... 46699/77

[51] Int. Cl.$^3$ ............................................. A23C 20/00
[52] U.S. Cl. .................................... 426/573; 426/576; 426/656; 426/582; 426/613
[58] Field of Search ............... 426/656, 573, 576, 582, 426/46, 634

[56] References Cited

U.S. PATENT DOCUMENTS

| | | | |
|---|---|---|---|
| 3,891,777 | 6/1975 | Boyer | 426/573 |
| 3,891,778 | 6/1975 | Boyer | 426/573 |
| 4,073,948 | 2/1978 | Chandler | 426/46 |

OTHER PUBLICATIONS

Food Engineering, Jun. 1977, p. 37, New Approach to Imitation Cheese Uses Carrageenan for Desirable Texture.
Marine Colloids, Inc. Carrageenan in Imitation Cheese, Prel. Bulletin.
Marine Colloids, Inc., Carrageenan in Imitation Cheese, 10-1977, #877.
Lin, C. F., Food Colloids, Avi Press, Westport Conn., 1977, pp. 320-346.
Lin, C. F., Macromolecules 3 (3) 269-274 (1970).
Chem. Abstracts, vol. 73, 45742s (1970).
MacMullan, E. A. et al., Colloid Science, vol. 18, pp. 526-537 (1963).
Anon., "Superior Stabilization of Co Hage Cheese Dressing with GFS", Kelco Co. Tech. Bull. F-68.
Anon., "GFS in Cream Cheese Neuftschel", Kelco Co. Tech. Bull. F-69.
Anon., "GFS in Pasteurized Process Cheese Spread", Kelco Tech. Bull., F-70.
Kovacs P. "Xanthan Gum", Food Trade Review 43 (11) 17-22 (1973).
Anon., Xanthan Gum 2nd ed. Booklet Pub. Kelco Div. of Merck & Co. Inc., Clark, NJ 3, 1976, pp. 21-25.
Kovacs P., Useful in Compatibility of Xanthan Gum with Galactomannan Food Tech. 27 (3) 26-29 (1973).
Anon., "Colloid-O-Scope", Marine Colloids Inc. 11 (pp. 2 & 3) 1965.
Glicksman, M. and Sand, R. E., Industrial Gums, Academic Press, N.Y. 1973, pp. 234-259.
Glicksman, M., Gum Technology in the Food Ind., Acad. Press, N.Y., 1969, pp. 391-393.
Anon., "Xanthan Gum Offers Versatility, Safety", Food Tech. 28 (6 18-20) 1974.
Haga, S. et al., Nippon Shokuhin Kogyo Gakkaishi 25 (4) 231-234 (1978).

*Primary Examiner*—Jeanette M. Hunter
*Attorney, Agent, or Firm*—Fulbright & Jaworski

[57] ABSTRACT

A proteinaceous food product simulating cheese, comprising a blend of (a) soy protein selected from the class consisting of soy isolate, cold insoluble soy fraction, and combinations thereof, (b) gelatin, (c) a hydrocolloid gum preferably including either xanthan-locust bean gum mixtures and carrageenans, (d) fat, and (e) water. Other desirable ingredients include an emulsifier, salt, chelating agent, coloring agent and flavoring.

12 Claims, No Drawings

PROTEINACEOUS FOOD PRODUCT

CROSS-REFERENCE TO RELATED APPLICATIONS

This application is a continuation of application Ser. No. 949,928, filed Oct. 10, 1978 now abandoned, which in turn is a continuation-in-part of application Ser. No. 916,028, filed June 15, 1978 now abandoned.

BACKGROUND OF THE INVENTION

The present invention relates to proteinaceous food products resembling, for example, American process cheese and methods for producing these products from plant-derived protein. Because the primary ingredients of natural process cheese are animal in origin, the protein product according to the present invention is referred to herein as "simulated cheese".

Depending on the amount of protein, food products formulated according to the present invention are useful edibly as, for example, spreads, foods or cheeses. As compared with natural process cheese, the products according to the present invention are economical, nutritious, have comparable food value, may be prepared without salt for persons on salt-free diets, may be prepared with vegetable oil instead of animal fats to accommodate persons on low-cholesterol diets, and may be mass-produced for institutional purposes.

The protein from which formulations according to the present invention may be made is derived from soy beans. Heretofore, soy protein has been very difficult to process into an acceptable simulated cheese product comparable to, for example, American cheese, because American cheese is possessed of numerous physical characteristics that are extremely difficult to reproduce in a simulated cheese. For example, important characteristics include gel strength, melting properties, appearance such as smoothness, shininess and translucence, mouth-feel such as smoothness, chewiness and creaminess, texture such as coarseness and grain, mushiness such as yield upon being squeezed, elasticity, stickiness, homogeneity and emulsification. Perhaps the most important of the foregoing characteristics are melt, mouth-feel and mushiness. It will be recognized, of course, that many of the characteristics are highly subjective for evaluation purposes. Notwithstanding the matter of subjectivity, the protein food product of the present invention very closely simulates natural process cheese such as American cheese.

SUMMARY OF THE INVENTION

Advantageously, the soy protein incorporated in formulations according to the present invention may be (1) soy isolate, a conventional, relatively inexpensive and readily available protein material, (2) a cold insoluble soy fraction (referred to herein for convenience as "CIF") prepared by a unique process as will be described, and (3) mixtures of (1) and (2). The simulated cheese products formulated from these proteinaceous soy materials closely resemble natural process cheese with the concomitant advantages attributable to plant-derived proteins mentioned above.

While the emphasis herein is on the production of a cheese-like protein food product that simulates American cheese, formulations according to the present invention may simulate cheddar cheese, mozzarella cheese and cheese spreads depending on the amount of protein added, flavor materials added and the like. As compared with American cheese, the product according to the present invention can be nutritionally equivalent from the standpoint of protein, vitamins and minerals. As compared with prior conventional soy protein imitation cheese products, the formulations according to the present invention provide a simulated American cheese that has outstanding melting, gelling and texturing characteristics directly attributable to the unique combination of ingredients. Quite unexpectedly, formulations according to the present invention provide an imitation American cheese with excellent smoothness, elasticity and cheese-like characteristics believed to be attributable to the combination of hydrocolloid gums with the soy protein, neither of which materials without the other provides a product with such characteristics.

The essential ingredients of the formulations according to the present invention include soy protein, gelatin, one or more hydrocolloid gums, a fat, water and acid if necessary to adjust the mixture to the desired pH. Calcium salts, carbohydrates, and an emulsifier may be added for functional purposes depending on the particular formulation as as will be explained. Salt, a chelating agent, flavor, coloring and the like also may be added.

It is, therefore, an object of the present invention to provide a novel proteinaceous food product simulating cheese.

Another object of the present invention is the provision of a proteinaceous food product comprising a blend of a protein selected from the class consisting of soy isolate, cold insoluble soy fraction, and combinations thereof, gelatin, hydrocolloid gum, fat and water, wherein the food product has a pH of about 5.0 to about 5.8.

Still another object of the present invention is the provision of a proteinaceous food product simulating cheese, comprising a blend (stated in weight percent on a final weight basis) of (a) soy protein selected from the class consisting of about 0 to about 25% soy isolate, about 0 to 25% cold insoluble soy fraction, and combinations thereof totaling 25% soy protein, (b) up to 5% gelatin, (c) about 0.1 to 2.5% hydrocolloid gum (d) fat in an amount effective to give desired characteristics of melt, mouth feel and mushiness, and (e) water in an amount effective to solubilize the said blend and to aid in melting of the final food product, said food product having a pH of about 5.0 to 5.8.

Other and further objects, features and advantages will be apparent from the following description of the invention given for the purpose of disclosure.

DESCRIPTION OF THE PREFERRED EMBODIMENT

To illustrate the formulations according to the present invention and the outstanding characteristics possessed thereby, Table A is a tabular presentation of imitation cheese formulations with an identification of the ingredients thereof expressed in gram weight. Below the formulations in Table A is an evaluation of each formulation along the lines described above, the evaluations comprising numerical ratings. Table B provides a reference scale for interpretation of the numerical ratings set forth in Table A. By cross-referencing Tables A and B, the necessary and essential ingredients according to the present invention may be noted as hereafter discussed.

TABLE A

| Ingredients* | Run No. | | | | | | | | | | |
|---|---|---|---|---|---|---|---|---|---|---|---|
| | 1 | 2 | 3 | 4 | 5 | 6 | 7 | 8 | 9 | 10 | 11 |
| PROTEIN: | | | | | | | | | | | |
| CIF (Potassium Form) | — | — | 20 | 25 | 25 | 25 | 30 | 30 | 30 | 35 | 50 |
| Supro-710 | 100 | 100 | 80 | 75 | 75 | 75 | 70 | 70 | 70 | 65 | 50 |
| GELATIN: | | | | | | | | | | | |
| Type B (225 bl) | 20 | 10 | 17.5 | 20 | 17.5 | 20 | 20 | 20 | 20 | 17.5 | — |
| Type A (275 bl) | — | 10 | — | — | 2.5 | — | — | — | — | 2.5 | — |
| HYDROCOLLOID GUM: | | | | | | | | | | | |
| Xanthan | — | — | — | — | — | — | — | — | — | — | — |
| NJAL-411 (low vis., locust bean gum) | — | — | — | — | — | — | — | — | — | — | — |
| NJAL-414 or RE8064 | 5 | 5 | 6 | — | 6 | 6 | 6 | 6 | 6 | 6 | 10 |
| Genugel X-7766 | — | — | — | 6 | — | — | — | — | — | — | — |
| FAT/EMULSIFIER: | | | | | | | | | | | |
| Fat PS-29 | 80 | 80 | 80 | 80 | 80 | 80 | 80 | 80 | 80 | 80 | 80 |
| Fat PS-12 | — | — | — | — | — | — | — | — | — | — | — |
| Tween 80 | 2 | 2 | 3 | 3 | 2 | 3 | 2 | 3 | 2 | 2 | 2 |
| Atmos-300 | — | — | — | — | — | — | — | — | — | — | — |
| Tween 60K | — | — | — | — | — | — | — | — | — | — | — |
| Emplex | — | — | — | — | — | — | — | — | — | — | — |
| SALTS: | | | | | | | | | | | |
| Sodium Chloride | 10 | 10 | 9.5 | 10 | 10 | 10 | 10 | 10 | 10 | 10 | 6 |
| Ca Gluconate | — | — | — | — | — | 2 | 1 | 2 | 4 | — | — |
| CaSO$_4$ | — | — | — | — | — | — | — | — | — | — | 6 |
| Potassium Citrate | — | — | 0.5 | — | — | — | — | — | — | — | — |
| Potassium Chloride | — | — | — | — | — | — | — | — | — | — | — |
| CaCl$_2$ | — | — | — | — | — | — | — | — | — | — | — |
| Sodium Hexametaphosphate | — | — | — | — | — | — | — | — | — | — | — |
| ACID: | | | | | | | | | | | |
| Lactic Acid | 1.5 | 1.5 | 1.8 | 1.8 | 1.5 | 1.8 | 1.9 | 1.8 | 1.8 | 1.8 | 1.4 |
| FLAVOR: | | | | | | | | | | | |
| (Miles)NCF 130 or 131 | 12 | 12 | — | — | 12 | — | 12 | — | 12 | 12 | 12 |
| (IFF)Enz. Mod. Cheese | — | — | 3 | 4 | — | 4 | — | 4 | — | — | — |
| CARBOHYDRATE. | | | | | | | | | | | |
| CMC (7LXF) | — | — | — | — | — | — | — | — | — | 2 | — |
| CPC Syrup (1022) | — | — | — | — | — | — | — | — | — | — | — |
| Lactose | — | — | — | — | — | — | — | — | — | — | — |
| WATER: | | | | | | | | | | | |
| H$_2$O | 182 | 185 | 193 | 190 | 183 | 188 | 182 | 188 | 179 | 181 | 198 |
| EVALUATIONS (See Table B) | | | | | | | | | | | |
| Penetrometer | 7 | 5 | 4 | 5 | 2 | 5 | 6 | 4 | 9 | 10 | 4 |
| Melt | 1.6 | 1.8 | 1.5 | 1.5 | 1.2 | 1.3 | 1.9 | 1.7 | 1.8 | 1.7 | 1.9 |
| Appearance | 9 | 9 | 9 | 9 | 9 | 9 | 9 | 8 | 10 | 9 | 9 |
| Mouthfeel | 8 | 9 | 8 | 8 | 9 | 8 | 9 | 8 | 9 | 8 | 6 |
| Texture | 6 | 8 | 7 | 8 | 8 | 7 | 9 | 9 | 10 | 9 | 9 |
| Mushiness | 9 | 8 | 9 | 9 | 8 | 9 | 9 | 8 | 8 | 8 | 7 |
| Break | 8 | 5 | 7 | 8 | 8 | 7 | 7 | 7 | 7 | 5 | 8 |
| Fold | 9 | 3 | 9 | 8 | 9 | 9 | 9 | 6 | 9 | 7 | 7 |
| Stickiness | 10 | 10 | 10 | 10 | 10 | 10 | 10 | 10 | 10 | 10 | 10 |
| Separation | 10 | 10 | 10 | 10 | 10 | 10 | 10 | 9 | 10 | 10 | 10 |

| Ingredients* | Run No. | | | | | | | | | | |
|---|---|---|---|---|---|---|---|---|---|---|---|
| | 12 | 13 | 14 | 5 | 16 | 17 | 18 | 19 | 20 | 21 | 22 |
| PROTEIN: | | | | | | | | | | | |
| CIF (Potassium Form) | 20 | 20 | 25 | 100 | — | — | — | 50 | — | — | 100 |
| Supro-710 | 80 | 80 | 75 | — | 100 | 100 | 100 | 50 | 100 | 100 | — |
| GELATIN: | | | | | | | | | | | |
| Type B (225 bl) | 15 | 15 | 15 | 15 | — | 20 | — | — | 20 | — | — |
| Type A (275 bl) | — | — | — | 5 | — | — | — | — | — | — | — |
| HYDROCOLLOID GUM: | | | | | | | | | | | |
| Xanthan | — | — | 2 | — | — | — | — | — | 2 | — | — |
| NJAL-411 (low vis., locust bean gum) | — | — | 2 | — | — | — | — | 10 | 2 | 5 | — |
| NJAL-414 or RE8064 | — | — | 6 | 5 | 8 | 5 | — | 10 | — | — | 10 |
| Genugel X-7766 | 6 | 6 | — | — | — | — | 8 | — | — | — | — |
| FAT/EMULSIFIER: | | | | | | | | | | | |
| Fat PS-29 | 80 | — | 80 | 80 | 80 | 80 | 80 | 80 | 80 | 80 | 80 |
| Fat PS-12 | — | 80 | — | — | — | — | — | — | — | — | 1.5 |
| Tween 80 | 3 | 3 | 2 | 2 | 2 | 3 | — | 2 | 3 | 3 | 0.5 |
| Atmos-300 | — | — | — | — | — | 1.5 | — | — | 1.5 | 1.5 | — |
| Tween 60K | — | — | — | — | — | — | 4 | — | — | — | — |
| Emplex | — | — | — | — | — | — | — | — | — | — | 0.2 |
| SALTS: | | | | | | | | | | | |
| Sodium Chloride | 9.5 | 7.5 | 10 | 10 | 10 | 7 | 10 | 6 | 7 | 7 | 10 |
| Ca Gluconate | — | — | — | — | — | 6 | — | — | — | — | 2 |
| CaSO$_4$ | — | — | — | — | — | — | — | 6 | — | — | — |

TABLE A-continued

| | | | | | | | | | | | |
|---|---|---|---|---|---|---|---|---|---|---|---|
| Potassium Citrate | 0.5 | 0.5 | — | — | — | — | — | — | — | — | — |
| Potassium Chloride | — | — | — | — | — | — | 0.8 | — | — | — | — |
| CaCl$_2$ | — | — | — | — | — | 0.8 | — | — | — | — | — |
| Sodium Hexametaphosphate | — | — | — | — | — | — | — | — | — | — | 0.6 |
| ACID: | | | | | | | | | | | |
| Lactic Acid | 1.8 | 2.0 | 1.5 | 1.0 | 1.7 | 1.6 | 2.0 | 1.4 | 1.5 | 1.7 | 1.1 |
| FLAVOR: | | | | | | | | | | | |
| (Miles)NCF 130 or 131 | — | — | 12 | 12 | — | — | — | 12 | 12 | 12 | — |
| (IFF)Enz. Mod. Cheese | 3 | 2 | — | — | — | — | — | — | — | — | — |
| CARBOHYDRATE: | | | | | | | | | | | |
| CMC (7LXF) | — | — | — | — | — | — | — | — | — | — | — |
| CPC Syrup (1022) | 15 | — | — | — | — | — | — | — | — | — | — |
| Lactose | — | — | — | — | — | — | — | — | — | — | 8 |
| WATER: | | | | | | | | | | | |
| H$_2$O | 181 | 192 | 184 | 185 | 214 | 190 | 204 | 198 | 181 | 180 | 201 |
| EVALUATIONS (See Table B) | | | | | | | | | | | |
| Penetrometer | 7 | 7 | 8 | 12 | 60 | 2 | 25 | 4 | 11 | 2 | 30 |
| Melt | 1.9 | 1.8 | 1.8 | 2.5 | 2.3 | 1.1 | 3.0 | 1.9 | 1.0 | 1.7 | 2.2 |
| Appearance | 9 | 9 | 9 | 9 | 1 | 9 | 10 | 9 | 9 | 9 | 10 |
| Mouthfeel | 8 | 9 | 8 | 6 | 1 | 9 | 10 | 9 | 9 | 9 | 10 |
| Texture | 8 | 9 | 9 | 8 | 8 | 10 | 9 | 8 | | | |
| Mushiness | 9 | 9 | 8 | 6 | 1 | 10 | 3 | 8 | 9 | 6 | 4 |
| Break | 7 | 8 | 8 | 1 | 7 | 7 | 7 | 8 | 8 | 5 | 6 |
| Fold | 7 | 7 | 8 | 1 | 9 | — | 1 | 8 | 9 | 6 | 1 |
| Stickness | 10 | 10 | 10 | 8 | 10 | 9 | 6 | 10 | 10 | 10 | 8 |
| Separation | 10 | 10 | 10 | 10 | 6 | 10 | 10 | 10 | 10 | 10 | 10 |

*Formulas are in grams, and most total about 415 grams. During preparation, all are cooked down to final weight of 400 grams.

TABLE B

EVALUATION SCALES:

Stickness:
  10 = Not sticky
  8 = Very slightly sticky
  6 = Slightly sticky
  4 = Medium sticky
  2 = Very sticky Penetrometer: The lower the number, the firmer the gel (for American cheese, "Penetrometer" = 10).

Melt:
  1 = Melts and flows to approximately twice its original surface after five minutes at 150° C.
  2 = Melt, no flow
  3 = Softens, no melt
  4 = Just barely softens Appearance, Mouthfeel, Texture, Mushiness, Fold:
  10 = Like Kraft brand American
  9 = Good
  8 = Good—
  7 = Fairly good+
  6 = Fairly good
  5 = Fairly good—
  4 = Fair+
  3 = Fair
  2 = Fair—
  1 = Poor Break:
  10 = Sharp and clean - like Kraft brand American
  9 = Fast, clean
  8 = Fast and slightly ragged
  7 = Fast, ragged
  6 = Medium fast, clean
  5 = Medium fast, slightly ragged
  4 = Medium fast, ragged
  3 = Slow clean
  2 = Slow, slightly ragged
  1 = Slow, ragged With reference to Table A, the protein component of formulations according to the present invention may comprise a soy isolate, a cold insoluble fraction of soy protein or a mixture of the two. Conventional soy isolates absorb water and, when incorporated in a simulated cheese, cause the cheese product to be dry, extremely firm and unmeltable. Consequently, the preferred soy isolate component is a product that is partially hydrolyzed such as that marketed commercially as "Supro 710", a product of The Ralston Purina Company, St. Louis, Mo., U.S.A. Supro 710 soy isolate has a relatively low viscosity in solution; has relatively low water absorption characteristics; has an acceptable bland taste; is reasonably light in color; is easily handled and blended with other ingredients and is not hygroscopic; is uniform in quality as supplied by the manufacturer; and is inexpensive and generally available in large quantities. These properties cause Supro 710 to be unique for purposes of the present invention although other comparable soy isolate materials may be used.

The cold insoluble fraction protein component is uniquely suited for use in formulations according to the present invention owing to its functional qualities from the standpoint of being thermoplastic in nature and a contributor to good gel characteristics of the final cheese-like product. The CIF material may be prepared as follows:

1. Soy beans are processed in conventional fashion including crushing or grinding followed by oil removal. Conventional processes of this nature are described in a book entitled Soybeans: Chemistry and Technology, Smith and Circle, Volume I ("Proteins"), The AVI Publishing Company, Inc., Westport, Ct., 1972. Soy flakes processed in this manner are an excellent starting material for the present invention and may be purchased on the open market. Preferably, soy flakes from which oil has been removed should have a minimum Nitrogen solubility Index (NSI) of 60 unground. The latter reference to "NSI" is a method for determination of the dispersible protein (which contains nitrogen) in soybean products according to Method Ba 11-65 of the American Oil Chemists Society as revised in 1969. While the preferred NSI is 60, the NSI value may vary somewhat, it being recognized that an NSI value of 40 produces relatively poor yields. The pH of the flakes in a slurry preferably will range from about 6.2 to about 6.8 in conventional forms available on the market and this pH range is preferred.

2. A liquor solution may be prepared from the soybean flakes by either single or multiple aqueous extraction methods, depending on the yield desired. A single extraction step preferably employs approximately five parts by weight of water to one part of weight soy flakes (unless stated otherwise herein, all references are to parts by weight). No sodium hydroxide or any other additives are used. The slurry should be mixed at a temperature of from about 55° C. to 70° C. for at least 15 to 20 minutes up to about 50 minutes in order for the protein to be placed in solution and minimize bacterial contamination. Solids may be separated from the solution by passing the slurry through a screen or centrifuge and then through a clarifier to remove the last traces of insoluble material. Conventional equipment for these purposes may be employed. Solids content of the resulting liquor is typically from about 10% to about 11% including protein, sugars, ash, etc. Total protein content of the liquor typically is from about 6% to about 7% by weight.

3. After passing the extract liquor through a clarifier, the liquor having about 10% to 11% total solids is collected preferably in a jacketed holding tank with chilled water circulating through the jacket. The extract liquor preferably is cooled to a temperature of from about 5° C. to about 10° C. with slow agitation to obtain adequate yield and yet minimize bacterial contamination. Reduction of the temperature from the initial elevated high temperature of about 65° C. to the 5° to 10° C. range should be gradual, preferably consuming from one to three hours time. To minimize bacterial activity, the reduction of temperature of from about 65° C. to about 21° C. preferably should occur approximately during the first half hour, the remaining reduction in temperature to from about 5° C. to about 10° C. consuming the remainder of the time. This temperature reduction step is important to success of the overall process. Once temperature of the liquor reaches the 5° to 10° C. range, it should be held at that temperature preferably for an additional hour. Some additional yield of protein is gained by holding the liquor for a total of 24 hours in the holding tank, but over 90% of all material collected when held for 24 hours is in fact yielded after about four hours. If yield and functionality are the only considerations, then a final cooling temperature range of from about 10° C. to about 18° C. is preferred.

4. Suspended in the chilled extract liquor is a curd material which can be separated such as by centrifugation or any other suitable separatory method. For example, a Sharples brand decantor may be employed if desired. The amount of curd separated from the extract liquor comprises about 3% to about 5% volumetrically of the total extract liquor. The centrifuge residue or curd is a yellow, stringy curd which is thermoplastic and soluble in water. Depending on the type of separatory device employed, the solids content of this curd is typically between 20% and 35% by weight. The higher the solids content, the more bland tasting will be the resulting protein fraction since most of the materials contributing to off-flavors remain with the whey, i.e., the liquid from which the curd was separated.

5. The curd comprises the desired CIF material in potassium form. It can be diluted and spray-dried or freeze-dried, and then incorporated into the formulations herein. On the other hand, if washing of the CIF curd is desired, it can be resolubilized in approximately three times its weight of water and acidified to a pH of about 5.3 preferably with a 10% solution of hydrochloric acid. This results in the formation of a curd precipitate which can be separated as by centrifugation of the like. The curd precipitate may then be washed, preferably with water, the temperature of which is not critical, but about 27° C. being preferred. The washed curd precipitate can then be neutralized, that is, its pH adjusted, back to a pH of from about 6.3 to 6.8, preferably by the use of potassium hydroxide. Again, drying can be carried out either by freeze-drying or by spray-drying, and the resulting material again is CIF material suitable for use according to the present invention. It will be recognized that the resulting material, although referred to herein as "cold insoluble fraction", is not the same type of material referenced in the Smith and Circle book by the same nomenclature. Consequently, the terms "CIF" and "cold insoluble fraction" as used herein refer to the material produced by the steps described above rather than to conventional cold insoluble fraction soy material as, for example, described in the Smith and Circle book.

Preferably, the protein material of formulations of the present invention comprises a mixture of soy isolate and CIF as, for example, a 30 weight percent CIF and 70 weight percent soy isolate mixture. The use of 100% protein in the form of Supro 710 brand soy isolate is satisfactory, but such material causes the resulting cheese-like product to melt in one's hand and is slightly sticky with not as much translucence as is desired. In addition, Supro 710 absorbs coloring material that is added to the formulation resulting in a cheese-like product that does not have a precise cheese appearance. Because Supro 710 is not functional in nature, it is necessary in formulations using substantial quantities of such material as the protein to add a high concentration of gelling agents. On the other hand, CIF material is functional, contributes to gelling, does not absorb coloring material and hence enhances and brings out color, and the use of a 30-70 mixture of CIF and Supro 710 as protein in formulations according to the present invention is more desirable than the use of Supro 710 or CIF alone. Surprisingly and quite unexpectedly, the use of such a mixture results in a cheese-like product that is more elastic and, upon being cooled after melting, will reassume its cheese-like characteristics whereas 100% hydrolyzed soy isolate as the protein herein will not do so. In addition, the 30-70 mixture has better mouth-feel characteristics and appearance inasmuch as the CIF unexpectedly enhances color characteristics and does not absorb coloring material.

Essential to formulations according to the present invention is the use of gelatin and hydrocolloid gums for gelling and texturing qualities. Gelatins that may be used include high bloom Gelatin A and medium bloom Gelatin B, both of which are commercial designations for acid and base processed materials, respectively. Both gelatins are protein-like in nature and serve as stabilizers. Hydrocolloid gum materials that may be used include xanthan-locust bean gum mixtures and carrageenans. There are three general varieties of carrageenans including the kappa variety, the lambda variety and the iota variety. Of these, the kappa variety is preferred. The lambda and iota varieties can be used but are not as effective as the kappa variety. Carrageenans are available commercially from Marine Colloids, Inc. of Springfield, N.J. 07081, U.S.A. Preferred kappa carrageenans for use in formulations according to the present invention are designated by Marine Colloids, Inc. as NJAL414 and RE8064, both of which are modifications of a product marketed by that company as Gelcarin HWG. Another suitable hydrocolloid gum is Genugel X-7766 marketed by Hercules, Inc. of Wilmington, Delaware.

Fat is an essential ingredient in formulations according to the present invention. The melting point of the fat is not critical and can be varied depending upon the properties of the product desired. It has been found that fats suitable for use in formulations according to the present invention include, for example, products produced commercially having melting points of about 35° to about 47° C. marketed by Anderson, Clayton & Co., Foods Division, Dallas, Texas, U.S.A. as Fat PS-29 and Fat PS-12.

Acid is another essential ingredient for formulations according to the present invention to the extent that the pH of any particular formulation must be adjusted. A suitable pH range for final solutions of formulations herein is 5.0 to 5.8 and preferably 5.2 to 5.4. Lactic acid is preferred although other acids such as adipic, citric and the like may be used. Lactic acid is preferred inasmuch as it enhances a cheese-like taste and is ideal for use herein. While the use of acid in final solutions of formulations according to the present invention is considered essential, it will be appreciated that, if other acidic substances are incorporated into formulations, adjustment of the pH and hence addition of acid may not be necessary.

Finally, water is an essential ingredient of formulations herein for purposes not only of solubilizing or dispersing ingredients, but also to aid in melting of the final product. That is, the melting of cheese and cheese-like products is a phenomenon whereby the components thereof dissolve or disperse in water. Consequently, sufficient water is necessary to solubilize and emulsify all of the other ingredients.

Non-essential but nevertheless desirable ingredients include an emulsifier, salt, chelating agent, carbohydrate, coloring agent, and flavoring. It will be recognized, of course, that amounts of these materials may vary depending upon the characteristics desired in the ultimate cheese-like product.

Emulsifiers that are particularly suitable for use in formulations according to the present invention include "Tween 60", "Tween 80", "Span 80" and "Atmos 300", all commercial designations of ICI United States, Inc., Specialty Chemicals Division, Wilmington, Del. 19890, U.S.A. Also suitable are an emulsifier designated commercially as "Emplex", a product of Patco Products, Kansas City, Mo., U.S.A., "Centrolines S" and "A", products of Central Soya, 1825 North Laramie Avenue, Chicago, Ill. 60639, U.S.A., and "Witconol" and "Emphos", products made by Witco Chemical Company, 3230 Brookfield, Houston, Tex. 77045, U.S.A.

From the standpoint of cheese-like physical characteristics of the finished product of formulations according to the present invention, salt (sodium chloride) is highly undesirable inasmuch as it is detrimental to gelling, produces stickiness and causes oil to break out. However, salt is an important ingredient in formulations herein for taste purposes. Other salts that may be used include, for example, calcium gluconate, calcium sulfate, potassium citrate, potassium chloride and calcium chloride.

A chelating agent such as sodium hexametaphosphate may be useful as a scavenger or binder for excess calcium in solutions of formulations herein. Calcium may be added in the form of calcium gluconate, calcium sulfate or even calcium lactate to serve as a cross-linking agent linking protein and hydrocolloid gum, and any excess calcium may be bound by the chelating agent.

Carbohydrates that may be used include, for example, sodium carboxymethylcellulose marketed by Hercules, Inc. as 7LXF type, and CPC Syrup (1022) marketed by CPC International, Inc., International Plaza, Englewood Cliffs, N.J.

Because soy protein is generally bland, flavor materials may be added to provide a natural cheese flavor. For example, enzyme-modified cheese is suitable for use in formulations according to the present invention to provide natural cheese flavor. Suitable artificial cheese flavorings may be added. Examples of flavorings are NCF130 or 131 marketed by Miles Laboratories, Inc., Marshall Division, Elkhart, Ind., and IFF EMC 73538674 marketed by International Flavors and Fragrances Co., 521 W. 57th, New York, N.Y.

It is highly desirable to add a coloring agent to formulations according to the present invention. Suitable is a standard agent designated A-400-SP-64 which is available from numerous manufacturers. Approximately one drop of coloring agent per about 100 grams of formulation may be used.

The process by which the formulations of Table A were prepared included the following steps:

1. The fat was melted and the emulsifiers and hydrocolloid gums dissolved or dispersed therein;
2. The gelatin was dissolved in the water at a temperature of about 70° C.;
3. The fat and water solutions from the two steps above were then blended in a steam-heated Waring Blender;
4. Sodium chloride, calcium gluconate, or other salts, if used, were added to the blend;
5. The dried protein was worked into the blend which was maintained at a temperature of about 80° C.;
6. The lactic acid, flavoring material, coloring agent and chelating agent were added;
7. All of the ingredients were then mixed for about ten minutes at a temperature of about 80° C.;
8. Weight of the mixture was checked and water content was adjusted by adding water or by cooking the mixture down to a final weight of about 400 grams; and
9. The mixture was poured into molds, temperature and pH checked and the product refrigerated at least overnight.

It will be appreciated that the foregoing steps may be varied as desired.

From the foregoing discussions, examples and description of the invention, it is apparent that the objects set forth herein as well as others have been achieved. Those skilled in the art will recognize that the principles of this invention may be applied in several ways, only a few of which have been exemplified specifically herein. Accordingly, the invention is to be limited only by the spirit thereof and the scope of the appended claims.

What is claimed is:

1. A proteinaceous food product simulating cheese, comprising a blend of the following by weight percent on a pre-cooked basis:
    (a) soy protein comprising in combination soy isolate and cold insoluble soy fraction,
    (b) up to about 5% gelatin,
    (c) about 0.1 to 2.5% hydrocolloid gum,
    (d) fat in an amount effective to give desired characteristics of melt, mouth-feel and mushiness of the food product, and
    (e) water in an amount effective to solubilize the said blend and to aid in melting of the final food product, said food product having a pH of about 5.0 to 5.8.

2. The proteinaceous food product of claim 1 including, additionally, salt and flavoring material.

3. The proteinaceous food product of claim 1 in which the hydrocolloid gum is selected from the class consisting of xanthan-locust bean mixtures and carrageenans and combinations thereof.

4. the proteinaceous food product of claim 1 wherein the hydrocolloid gum comprises about 0.2 to 0.5% xanthan-locust bean mixtures and about 0.5 to 2.5% carrageenans.

5. The proteinaceous food product of claim 1 wherein the fat is a vegetable oil fat having a melting point of about 35° to about 45° C.

6. The proteinaceous food product of claim 1 including, additionally, up to about 0.5% of an emulsifier.

7. The proteinaceous food product of claim 1 including acid in an amount effective to give the food product a pH of about 5.0 to 5.8.

8. The proteinaceous food product of claim 1 including lactic acid in an amount effective to give the food product a pH of about 5.2 to 5.4.

9. The proteinaceous food product of claim 1 including, additionally,
   (f) about 1.7 to 3.9% salt, and
   (g) up to 3% flavoring materials.

10. A proteinaceous food product simulating cheese, comprising a blend of the following by weight percent on a finished product basis:
    (a) soy protein including about 18.8% soy isolate and about 6.2% of a functional cold insoluble soy fraction,
    (b) about 5% gelatin,
    (c) hydrocolloid gum including about 0.5% xanthan-locust bean mixtures and about 2% carrageenans,
    (d) about 20% fat,
    (e) about 0.5% emulsifier,
    (f) about 2.5% salt,
    (g) about 0.4% acid, (h) about 1% flavoring materials, (i) about 42% water, and
    (j) about 2.4% carbohydrate.

11. The proteinaceous food product of claim 8 wherein the carrageenans are of the kappa variety.

12. The proteinaceous food product of claim 10 wherein the acid is lactic acid.

* * * * *

UNITED STATES PATENT AND TRADEMARK OFFICE
CERTIFICATE OF CORRECTION

PATENT NO. : 4,303,691

DATED : December 1, 1981

INVENTOR(S) : Ralph E. Sand et al

It is certified that error appears in the above—identified patent and that said Letters Patent is hereby corrected as shown below:

Table A should read as shown on the attached sheets:

Signed and Sealed this

First Day of June 1982

|SEAL|

Attest:

Attesting Officer

GERALD J. MOSSINGHOFF

Commissioner of Patents and Trademarks

Patent No. 4,303,691 TABLE A

| Run No. | 1 | 2 | 3 | 4 | 5 | 6 | 7 | 8 | 9 | 10 | 11 |
|---|---|---|---|---|---|---|---|---|---|---|---|
| Ingredients* | | | | | | | | | | | |
| PROTEIN: | | | | | | | | | | | |
| CIF (Potassium Form) | – | – | 20 | 25 | 25 | 25 | 30 | 30 | 30 | 35 | 50 |
| Supro-710 | 100 | 100 | 80 | 75 | 75 | 75 | 70 | 70 | 70 | 65 | 50 |
| GELATIN: | | | | | | | | | | | |
| Type B (225 bl) | 20 | 10 | 17.5 | 20 | 17.5 | 20 | 20 | 20 | 20 | 17.5 | – |
| Type A (275 bl) | – | 10 | – | – | 2.5 | – | – | – | – | 2.5 | – |
| HYDROCOLLOID GUM: | | | | | | | | | | | |
| Xanthan | – | – | – | – | – | – | – | – | – | – | – |
| NJAL-411 (low vis., locust bean gum) | – | – | – | – | – | – | – | – | – | – | – |
| NJAL-414 or RE8064 | 5 | 5 | 6 | – | 6 | 6 | 6 | 6 | 6 | 6 | 10 |
| Genugel X-7766 | – | – | – | 6 | – | – | – | – | – | – | – |
| FAT/EMULSIFIER: | | | | | | | | | | | |
| Fat PS-29 | 80 | 80 | 80 | 80 | 80 | 80 | 80 | 80 | 80 | 80 | 80 |
| Fat PS-12 | – | – | – | – | – | – | – | – | – | – | – |
| Tween 80 | 2 | 2 | 3 | 3 | 2 | 3 | 2 | 3 | 2 | 2 | 2 |
| Atmos-300 | – | – | – | – | – | – | – | – | – | – | – |
| Tween 60K | – | – | – | – | – | – | – | – | – | – | – |
| Emplex | – | – | – | – | – | – | – | – | – | – | – |
| SALTS: | | | | | | | | | | | |
| Sodium Chloride | 10 | 10 | 9.5 | 10 | 10 | 10 | 10 | 10 | 10 | 10 | 6 |
| Ca Gluconate | – | – | – | – | – | 2 | 1 | 2 | 4 | – | – |
| $CaSO_4$ | – | – | – | – | – | – | – | – | – | – | 6 |
| Potassium Citrate | – | – | 0.5 | – | – | – | – | – | – | – | – |
| Potassium Chloride | – | – | – | – | – | – | – | – | – | – | – |
| $CaCl_2$ | – | – | – | – | – | – | – | – | – | – | – |
| Sodium Hexametaphosphate | – | – | – | – | – | – | – | – | – | – | – |
| ACID: | | | | | | | | | | | |
| Lactic Acid | 1.5 | 1.5 | 1.8 | 1.8 | 1.5 | 1.8 | 1.9 | 1.8 | 1.8 | 1.8 | 1.4 |
| FLAVOR: | | | | | | | | | | | |
| (Miles)NCF 130 or 131 | 12 | 12 | – | – | 12 | – | 12 | – | 12 | 12 | 12 |
| (IFF)Enz.Mod.Cheese | – | – | 3 | 4 | – | 4 | – | 4 | – | – | – |
| CARBOHYDRATE: | | | | | | | | | | | |
| CMC (7LXF) | – | – | – | – | – | – | – | – | – | 2 | – |
| CPC Syrup (1022) | – | – | – | – | – | – | – | – | – | – | – |
| Lactose | – | – | – | – | – | – | – | – | – | – | – |
| WATER: | | | | | | | | | | | |
| $H_2O$ | 182 | 185 | 193 | 190 | 183 | 188 | 182 | 188 | 179 | 181 | 198 |
| EVALUATIONS (See Table B) | | | | | | | | | | | |
| Penetrometer | 7 | 5 | 4 | 5 | 2 | 5 | 6 | 4 | 9 | 10 | 4 |
| Melt | 1.6 | 1.8 | 1.5 | 1.5 | 1.2 | 1.3 | 1.9 | 1.7 | 1.8 | 1.7 | 1.9 |
| Appearance | 9 | 9 | 9 | 9 | 9 | 9 | 9 | 8 | 10 | 9 | 9 |
| Mouthfeel | 8 | 9 | 8 | 8 | 9 | 8 | 9 | 8 | 9 | 8 | 6 |
| Texture | 6 | 8 | 7 | 8 | 8 | 7 | 9 | 9 | 10 | 9 | 9 |
| Mushiness | 9 | 8 | 9 | 9 | 8 | 9 | 9 | 8 | 8 | 8 | 7 |
| Break | 8 | 5 | 7 | 8 | 8 | 7 | 7 | 7 | 7 | 5 | 8 |
| Fold | 9 | 3 | 9 | 8 | 9 | 9 | 9 | 6 | 9 | 7 | 7 |
| Stickiness | 10 | 10 | 10 | 10 | 10 | 10 | 10 | 10 | 10 | 10 | 10 |
| Separation | 10 | 10 | 10 | 10 | 10 | 10 | 10 | 9 | 10 | 10 | 10 |

\* Formulas are in grams, and most total about 415 grams.
During preparation, all are cooked down to final weight of 400 grams.

Patent No. 4,303,691

TABLE A

| Run No. | 12 | 13 | 14 | 15 | 16 | 17 | 18 | 19 | 20 | 21 | 22 |
|---|---|---|---|---|---|---|---|---|---|---|---|
| Ingredients* | | | | | | | | | | | |
| PROTEIN: | | | | | | | | | | | |
| CIF (Potassium Form) | 20 | 20 | 25 | 100 | - | - | - | 50 | - | - | 100 |
| Supro-710 | 80 | 80 | 75 | - | 100 | 100 | 100 | 50 | 100 | 100 | - |
| GELATIN: | | | | | | | | | | | |
| Type B (225 bl) | 15 | 15 | 15 | 15 | - | 20 | - | - | 20 | 20 | - |
| Type A (275 bl) | - | - | - | 5 | - | - | - | - | - | - | - |
| HYDROCOLLOID GUM: | | | | | | | | | | | |
| Xanthan | - | - | 2 | - | - | - | - | - | 2 | - | - |
| NJAL-411 (low vis., locust bean gum) | - | - | 2 | - | - | - | - | - | 2 | 5 | - |
| NJAL-414 or RE8064 | - | - | 6 | 5 | 8 | 5 | - | 10 | - | - | 10 |
| Genugel X-7766 | 6 | 6 | - | - | - | - | 8 | - | - | - | - |
| FAT/EMULSIFIER: | | | | | | | | | | | |
| Fat PS-29 | 80 | - | 80 | 80 | 80 | 80 | 80 | 80 | 80 | 80 | 80 |
| Fat PS-12 | - | 80 | - | - | - | - | - | - | - | - | - |
| Tween 80 | 3 | 3 | 2 | 2 | 2 | 3 | - | 2 | 3 | 3 | 1.5 |
| Atmos-300 | - | - | - | - | - | 1.5 | - | - | 1.5 | 1.5 | 0.5 |
| Tween 60K | - | - | - | - | - | - | 4 | - | - | - | - |
| Emplex | - | - | - | - | - | - | - | - | - | - | 0.2 |
| SALTS: | | | | | | | | | | | |
| Sodium Chloride | 9.5 | 7.5 | 10 | 10 | 10 | 7 | 10 | 6 | 7 | 7 | 10 |
| Ca Gluconate | - | - | - | - | - | 6 | - | - | - | - | 2 |
| CaSO$_4$ | - | - | - | - | - | - | - | 6 | - | - | - |
| Potassium Citrate | 0.5 | 0.5 | - | - | - | - | - | - | - | - | - |
| Potassium Chloride | - | - | - | - | - | - | 0.8 | - | - | - | - |
| CaCl$_2$ | - | - | - | - | - | - | 0.8 | - | - | - | - |
| Sodium Hexametaphosphate | - | - | - | - | - | - | - | - | - | - | 0.6 |
| ACID: | | | | | | | | | | | |
| Lactic Acid | 1.8 | 2.0 | 1.5 | 1.0 | 1.7 | 1.6 | 2.0 | 1.4 | 1.5 | 1.7 | 1.1 |
| FLAVOR: | | | | | | | | | | | |
| (Miles)NCF 130 or 131 | - | - | 12 | 12 | - | - | - | 12 | 12 | 12 | - |
| (IFF)Enz.Mod.Cheese | 3 | 2 | - | - | - | - | - | - | - | - | - |
| CARBOHYDRATE: | | | | | | | | | | | |
| CMC (7LXF) | - | - | - | - | - | - | - | - | - | - | - |
| CPC Syrup (1022) | 15 | - | - | - | - | - | - | - | - | - | - |
| Lactose | - | - | - | - | - | - | - | - | - | - | 8 |
| WATER: | | | | | | | | | | | |
| H$_2$O | 181 | 192 | 184 | 185 | 214 | 190 | 204 | 198 | 181 | 180 | 201 |
| EVALUATIONS (See Table B) | | | | | | | | | | | |
| Penetrometer | 7 | 7 | 8 | 12 | 60 | 2 | 25 | 4 | 11 | 2 | 30 |
| Melt | 1.9 | 1.8 | 1.8 | 2.5 | 2.3 | 1.1 | 3.0 | 1.9 | 1.0 | 1.7 | 2.2 |
| Appearance | 9 | 9 | 9 | 9 | 1 | 9 | 10 | 9 | 9 | 9 | 10 |
| Mouthfeel | 8 | 9 | 8 | 6 | 1 | 9 | 8 | 8 | 10 | 9 | 8 |
| Texture | 8 | 9 | 9 | 8 | 3 | 9 | 9 | 9 | 8 | 9 | 10 |
| Mushiness | 9 | 9 | 8 | 6 | 1 | 10 | 3 | 8 | 9 | 6 | 4 |
| Break | 7 | 8 | 8 | 1 | 7 | 7 | 7 | 8 | 8 | 5 | 6 |
| Fold | 7 | 7 | 8 | 1 | 9 | - | 1 | 8 | 9 | 6 | 1 |
| Stickiness | 10 | 10 | 10 | 8 | 10 | 9 | 6 | 10 | 10 | 10 | 8 |
| Separation | 10 | 10 | 10 | 10 | 6 | 10 | 10 | 10 | 10 | 10 | 10 |

* Formulas are in grams, and most total about 415 grams.
During preparation, all are cooked down to final weight of 400 grams.